(12) United States Patent
Gao et al.

(10) Patent No.: US 10,142,812 B2
(45) Date of Patent: Nov. 27, 2018

(54) INCOMING CALL RESPONDING METHOD AND DEVICE FOR MULTI-CHANNEL TERMINAL

(71) Applicant: SPREADTRUM COMMUNICATIONS (SHANGHAI) CO., LTD., Shanghai (CN)

(72) Inventors: Xichun Gao, Shanghai (CN); Xianliang Chen, Shanghai (CN); Yi He, Shanghai (CN); Jinjin Ni, Shanghai (CN); Yiguo Zhao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/810,137

(22) Filed: Nov. 13, 2017

(65) Prior Publication Data

US 2018/0139591 A1    May 17, 2018

(30) Foreign Application Priority Data

Nov. 14, 2016  (CN) .......................... 2016 1 1000836

(51) Int. Cl.
| | | |
|---|---|---|
| *H04W 4/16* | (2009.01) | |
| *H04W 88/06* | (2009.01) | |
| *H04W 76/10* | (2018.01) | |
| *H04L 29/06* | (2006.01) | |

(52) U.S. Cl.
CPC ............. *H04W 4/16* (2013.01); *H04W 88/06* (2013.01); *H04L 29/06217* (2013.01); *H04W 76/10* (2018.02)

(58) Field of Classification Search
CPC ....... H04W 4/16; H04W 88/06; H04W 76/10; H04L 29/06217
USPC ....................................... 455/414.1
See application file for complete search history.

(56) References Cited

U.S. PATENT DOCUMENTS

2015/0382043 A1* 12/2015 Moon ................ H04N 21/4122
                                                         725/30

* cited by examiner

*Primary Examiner* — Inder P Mehra
(74) *Attorney, Agent, or Firm* — Kilpatrick Townsend & Stockton, LLP

(57) ABSTRACT

Incoming call responding method and device for a multi-channel terminal are provided. The method includes receiving a service request associated with a current subscriber identity card, and the service request comprises a called service request to a current subscriber which is identified by the current subscriber identity card, and in response to the service request, setting up a first service channel for making a call and playing a predetermined multimedia file based on an instruction of the current subscriber, and the first service channel is set up based on the current subscriber identity card. Further, the terminal may play the predetermined multimedia file to a remote terminal of the service request directly based on the first service channel, so as to make a personalized response to the service request, which may greatly improve operation experience of two subscribers of the call.

20 Claims, 2 Drawing Sheets

INCOMING CALL RESPONDING METHOD AND DEVICE FOR MULTI-CHANNEL TERMINAL

CROSS-REFERENCE TO RELATED APPLICATIONS

The present application claims priority to Chinese patent application No. 201611000836.7, filed on Nov. 14, 2016, and entitled "INCOMING CALL RESPONDING METHOD AND DEVICE FOR MULTI-CHANNEL TERMINAL", and the entire disclosure of which is incorporated herein by reference.

TECHNICAL FIELD

The present disclosure generally relates to communication technology field, and more particularly, to incoming call responding method and device for a multi-channel terminal.

BACKGROUND

With the continuous improvement of mobile network bandwidth and continuous optimization of upload and download rates, currently, calls of mobile terminals mainly include a variety of traditional related service based on data, such as voice call or video call.

Existing call waiting service is generally provided based on a network. For example, for a terminal which has opened the call waiting service, if a subscriber is currently inconvenient to answer a call, the subscriber can warn a sender of the call using warning tone provided by the network and hang up the call. For another example, if the subscriber has already been in a calling state and there is a new incoming call, and the subscriber does not want to answer the new incoming call, the subscriber can send a hang up command to the terminal. In response to the subscriber's hang up instruction, the terminal prompts through the network to a sender of the incoming call that a called subscriber is busy now, and hangs up the call.

In existing call waiting service, warning tones used for warning senders of subsequent incoming calls that the called subscriber is busy currently are constant, such as "the subscriber you dialed is busy now, please dial it later". These warning tones are generally recorded in advance by a service provider (i.e., the network) of the call waiting service, and the called subscriber is not capable of configuring the warning tone to be personalized, which is disadvantageous for calling experience of the called subscriber and the sender of the incoming call.

In the existing techniques, when the subscriber does not want to listen to the incoming call, or the subscriber receives a new incoming call when making a call based on the terminal, if the terminal supports the call waiting function, the subscriber may send a warning tone to the sender of the incoming call when selecting to reject the incoming call, so as to realize incoming call responding. However, the warning tones for the existing incoming call responding are predetermined by the service provider of the call waiting service, and the subscriber is not capable of configuring the warning tones to be personalized.

SUMMARY

In embodiments of the present disclosure, a personalized response may be made to an originating subscriber based on a terminal, which may improve operation experience of common calls of users.

In an embodiment of the present disclosure, an incoming call responding method for a multi-channel terminal is provided, including: receiving a service request associated with a current subscriber identity card, and the service request includes a called service request to a current subscriber which is identified by the current subscriber identity card; and in response to the service request, setting up a first service channel for making a call and playing a predetermined multimedia file based on an instruction of the current subscriber, and the first service channel is set up based on the current subscriber identity card.

In one embodiment, prior to receiving a service request associated with a current subscriber identity card, the current subscriber identity card may be in a call using a second service channel which is set up based on the current subscriber identity card.

In one embodiment, when the first service channel is set up for making a call, the second service channel may retain an activated state.

In one embodiment, the first and second service channels may be set up based on a same service access way.

In one embodiment, the method may further include: after the play of the predetermined multimedia file is terminated, releasing the first service channel.

In one embodiment, the instruction of the current subscriber may include: a real-time instruction obtained by interaction with the current subscriber after receiving the service request, or an instruction predetermined by the current subscriber before receiving the service request.

In one embodiment, service requested by the service request may include voice service or video service.

In one embodiment, the service request may include a service request based on an IP Multimedia Subsystem (IMS) network, and service requested by the service request may include service based on the IMS network.

In one embodiment, the service requested by the service request may include VoLTE service or VoWiFi service.

In one embodiment, the first and second service channels may perform service data transmission based on a data channel which is set up based on a radio network.

In one embodiment, the data channel may be a data channel based on an IMS network.

In one embodiment, the data channel based on the IMS network may include a data channel corresponding to IMS Public Data Network (PDN).

In one embodiment, the first and second service channels may correspond to different ports of the data channel.

In an embodiment of the present disclosure, an incoming call responding device for a multi-channel terminal is provided, including: a receiving circuitry configured to receive a service request associated with a current subscriber identity card, and the service request includes a called service request to a current subscriber which is identified by the current subscriber identity card; and a playing circuitry configured to: in response to the service request, set up a first service channel for making a call and play a predetermined multimedia file based on an instruction of the current subscriber, and the first service channel is set up based on the current subscriber identity card.

In one embodiment, the device may further include an implementing circuitry configured for the current subscriber identity card to make a call using a second service channel which is set up based on the current subscriber identity card, before the service request associated with the current subscriber identity card is received.

In one embodiment, when the playing circuitry sets up the first service channel for making a call, the second service channel retains an activated state.

In one embodiment, the first and second service channels may be set up based on a same service access way.

In one embodiment, the device may further include a terminating circuitry configured to: after the play of the predetermined multimedia file is terminated, release the first service channel.

In one embodiment, the instruction of the current subscriber may include: a real-time instruction obtained by interaction with the current subscriber after receiving the service request, or an instruction predetermined by the current subscriber before receiving the service request.

In one embodiment, service requested by the service request may include voice service or video service.

In one embodiment, the service request may include a service request based on an IMS network, and service requested by the service request may include service based on the IMS network.

In one embodiment, the service requested by the service request may include VoLTE service or VoWiFi service.

In one embodiment, the first and second service channels perform service data transmission based on a data channel which is set up based on a radio network.

In one embodiment, the data channel may be a data channel based on an IMS network.

In one embodiment, the data channel based on the IMS network may include a data channel corresponding to IMS PDN.

In one embodiment, the first and second service channels may correspond to different ports of the data channel.

Embodiments of the present disclosure may provide following advantages. A service request associated with a current subscriber identity card is received, and in response to the service request, a first service channel is set up for making a call and a predetermined multimedia file is played based on an instruction of the current subscriber, and the first service channel is set up based on the current subscriber identity card, and the service request includes a called service request to a current subscriber which is identified by the current subscriber identity card. Compared with the existing techniques where constant warning tone is sent to a sender of an incoming call based on a network, in embodiments of the present disclosure, the predetermined multimedia file which is personalized can be sent by the terminal to the sender of the incoming call based on the first service channel, which may improve user experience.

Further, prior to receiving a service request associated with a current subscriber identity card, the current subscriber identity card may be in a call using a second service channel which is set up based on the current subscriber identity card. Compared with the existing techniques where the terminal can only keep one service channel in an activated state at a time point, in embodiments of the present disclosure, one subscriber identity card can set up at least two service channels in the activated state, so that the subscriber in a calling state can still follow up a subsequent incoming call and play the predetermined multimedia file through other service channels, which may greatly improve user experience.

Further, after the play of the predetermined multimedia file is terminated, the first service channel is released, so that the terminal may control the playing procedure more flexibly, and timely make a feedback according to a playing status of the predetermined multimedia file.

DETAILED DESCRIPTION

As described in the background, in the existing techniques, during a call waiting operation, it is impossible to make personalized response to a sender of an incoming call based on a terminal. For a situation where multiple calls at a same time point are to be processed based on the call waiting operation, existing solutions as shown in FIG. 1 are employed.

Figure 1:
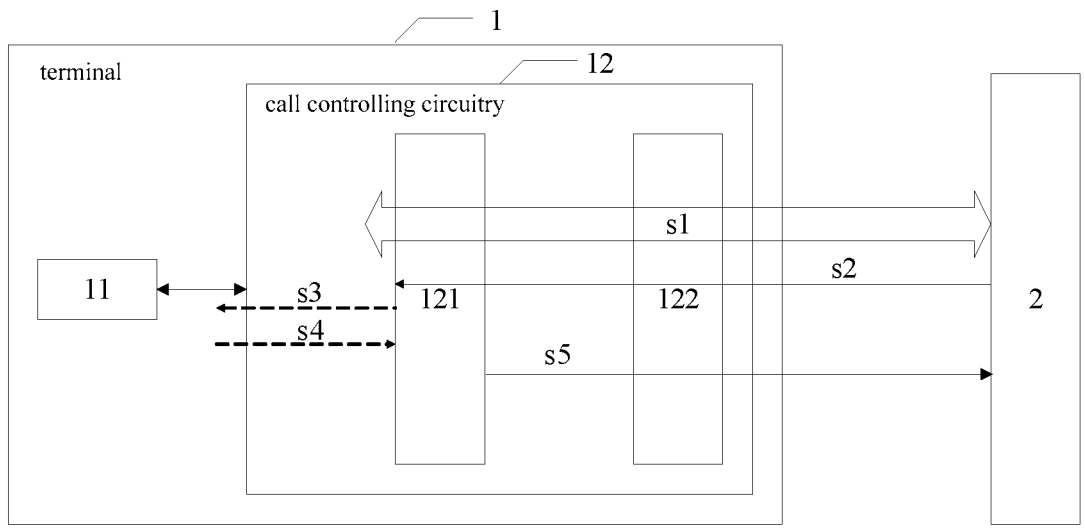
FIG. 1 schematically illustrates an application scene diagram of a method for processing multiple downlink service requests by a terminal supporting a call waiting function in the existing techniques.

FIG. 1 schematically illustrates an application scene diagram of a method for processing multiple downlink service requests by a terminal supporting a call waiting function in the existing techniques. The downlink service request may be a called service request to a subscriber (not shown in FIG. 1) which is identified by a subscriber identity card 11. In some embodiments, the subscriber identity card 11 in the terminal 1 sets up only one service channel (not shown in FIG. 1) in an activated state which transmits service data based on a data channel (not shown in FIG. 1). In some embodiments, the data channel may be set up by a service channel set-up controlling circuitry 121 and a radio source set-up controlling circuitry 122 in a call controlling circuitry 12 based on a radio connection with a network 2. The network 2 may be a radio network, and the subscriber identity card 11 may interact and make a call with a remote terminal (not shown in FIG. 1) of sending the service request based on the service channel. The terminal 1 can retain only a call with one remote terminal in an activated state at one time point based on the service channel.

For example, when the subscriber identity card 11 is in a call s1 based on the service channel, the terminal 1 receives a second service request s2 to the subscriber identity card 11. If the terminal 1 supports a call waiting function and the subscriber corresponding to the subscriber identity card 11 does not expect to get through the second service request s2, the terminal 1 may inform the network 2 that the subscriber 12 is busy now (In one embodiment, s3 may be performed to inform the subscriber 12, and the network 2 is informed that the subscriber 12 is busy now based on feedback s4 of the subscriber 12). The network 2 sends indication information indicating that the subscriber is busy now to a remote terminal that sends the second service request s2 based on an instruction of the terminal 1. The terminal 1 feedbacks to the network 2 that the subscriber is busy now s5 only based on constant content. For example, in VoLTE service, the terminal 1 may send a code 486 (busy here) or 603 (decline) to indicate that the subscriber is busy now. The network 2 may send indication information to the remote terminal that sends the second service request s2 based on the information received from the terminal 1, where content of the indication information is always constant, for example, "the subscriber you dialed is busy now, please dial it later". If the subscriber expects to send a personalized warning tone to the remote terminal that sends the second service request s2, the solutions as shown in FIG. 1 cannot meet the demand of the subscriber.

Based on researches, inventors found that the problems lie in that a single subscriber identity card can retain only one service channel in an activated state at one time point, and thus only one activated call can be carried at one time point.

In embodiments of the present disclosure, a service request associated with a current subscriber identity card is received, and in response to the service request, a first service channel is set up for making a call and a predetermined multimedia file is played based on an instruction of the current subscriber, and the first service channel is set up based on the current subscriber identity card, and the service request includes a called service request to a current subscriber which is identified by the current subscriber identity card. The predetermined multimedia file which is personalized can be sent by the terminal to a sender of an incoming call based on the first service channel, which may improve user experience.

In order to clarify the object, solutions and advantages of embodiments of the present disclosure, embodiments of present disclosure will be described clearly in detail in conjunction with accompanying drawings.

Figure 2:
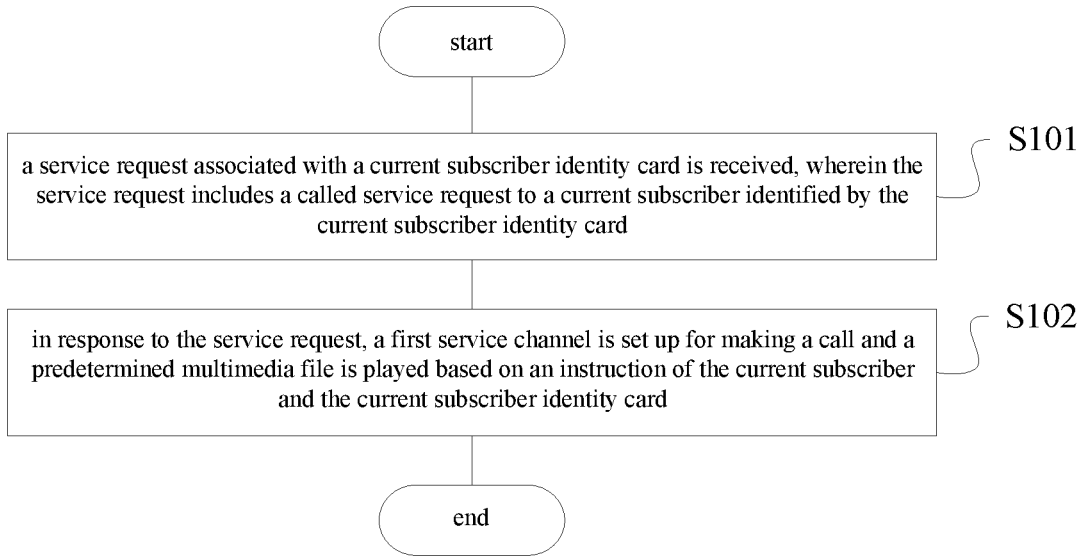
FIG. 2 schematically illustrates a flow chart of an incoming call responding method for a multi-channel terminal according to an embodiment.

FIG. 2 schematically illustrates a flow chart of an incoming call responding method for a multi-channel terminal according to an embodiment. The terminal may be a mobile terminal, or other terminal devices capable of processing multi-channel service. The multi-channel may be at least two service channels which perform service data transmission based on a data channel which is set up based on a radio network.

The radio network may include 5G, 4G, 3G, 2G or WiFi network. The data channel may be a channel used for transmitting data under various service types, such as a data channel based on an IMS network. For example, for VoLTE or VoWiFi service, the data channel may be a data channel corresponding to IMS PDN.

In some embodiments, S101 may be performed first. In S101, a service request associated with a current subscriber identity card is received, and the service request includes a called service request to a current subscriber which is identified by the current subscriber identity card. In some embodiments, being associated with the current subscriber identity card may include being associated with the subscriber identified by the current subscriber identity card.

Afterward, in S102, in response to the service request, a first service channel is set up for making a call and a predetermined multimedia file is played based on an instruction of the current subscriber, and the first service channel is set up based on the current subscriber identity card. In some embodiments, the first service channel is set up based on the current subscriber identity card by the current subscriber. In some embodiments, in response to the service request, the sender of the service request (i.e., a remote terminal sending the service request, for example, other terminal other than the terminal where the current subscriber is located) sets up a call with the current subscriber via the first service channel. However, during the call, the current subscriber plays the predetermined multimedia file instead of directly listening or responding in voice. The way of playing the predetermined multimedia file may be any suitable way in the existing techniques. For example, a multimedia file storing circuitry configured in the terminal is connected with the first service channel to play the multimedia file that is pre-stored in the multimedia file storing circuitry.

In some embodiments, the predetermined multimedia file may be obtained by recording in the terminal in advance by the current subscriber. For example, the current subscriber may record in the terminal a voice "the subscriber you dialed is busy now, please dial it later" in advance. After the first service channel is set up to make a call, the voice may be played to the sender of the service request based on the first service channel, so that the sender of the service request can perform subsequent actions according to indication of the voice, which may provide better experience for subscribers of the call. In some embodiments, the predetermined multimedia file may be a video. The predetermined multimedia file may be recorded by the current subscriber in other devices other than the terminal which are capable of recording multimedia files, and then transmitted to the terminal. More embodiments may be obtained by those skilled in the art according to practical requirements, and are not described in detail here.

In some embodiments, before S101, the current subscriber identity card may be in a call using a second service channel which is set up based on the current subscriber identity card. In some embodiments, the second service channel may be set up by the current subscriber based on the current subscriber identity card. Those skilled in the art can understand that, based on embodiments of the present disclosure, no matter whether the current subscriber identity card is using the second service channel to be in a call, when a new service request comes, the terminal can set up the first service channel to respond to the service request, so as to play the predetermined multimedia file to the sender of the new service request. In some embodiments, the current subscriber identity card has set up the second service channel with a network via the data channel which is set up based on the radio network.

In some embodiments, when the second service channel is set up or released based on the current subscriber identity card, the service request associated with the current subscriber identity card may be received.

In some embodiments, the first and second service channels may include channels for transmitting service data, such as voice or video. More embodiments may be obtained by those skilled in the art according to practical requirements, and are not described in detail here. In some embodiments, the call may include a voice call or a video call.

In some embodiments, when the first service channel is set up for making a call, the second service channel may retain an activated state. Those skilled in the art can understand that, the activated state denotes to a state where service data can be transmitted in a service channel.

In some embodiments, the first and second service channels may be set up based on a same service access way. The service access way may be realized through circuit switch, packet switch, IMS or an IP network.

In some embodiments, service requested by the service request may include voice service or video service.

In some embodiments, the service request may include a service request based on an IMS network, and service requested by the service request may include service based on the IMS network. In some embodiments, service corresponding to the second service channel may include service based on an IMS network.

In some embodiments, the service requested by the service request may include VoLTE service or VoWiFi service.

In some embodiments, the first and second service channels may perform service data transmission based on a data channel which is set up based on a radio network.

In some embodiments, the data channel may be a data channel based on an IMS network. For example, the data channel based on the IMS network may include a data channel corresponding to IMS PDN.

In some embodiments, the first and second service channels may correspond to different ports of the data channel. Those skilled in the art can understand that, different from the existing techniques, in embodiments of the present disclosure, multiple service channels may be set up based on the same data channel, and may be identified by different ports. For example, in VoLTE service, the different ports may be set up in a data channel corresponding to the same IMS PDN, to obtain the multiple service channels.

In some embodiments, the instruction of the current subscriber may include: a real-time instruction obtained by interaction with the current subscriber after receiving the service request. For example, the current subscriber is using the second service channel to make a call currently. After receiving the service request, the terminal send indication information to the current subscriber, and determine whether to respond to the service request based on feedback of the current subscriber. If the feedback of the current subscriber is to respond to the service request and to play a predetermined multimedia file, the terminal sets up the first service channel to set up another call, and plays the predetermined multimedia file to the sender of the service request.

In some embodiments, the instruction of the current subscriber may include: an instruction predetermined by the current subscriber before receiving the service request. For example, for a situation that the current subscriber receives a second call when making a first call, the current subscriber may preset the instruction in the terminal. If the current subscriber preset the instruction as playing a predetermined multimedia file to the second call, the terminal may not request the current subscriber after receiving the service request of the second call, and processing the service request according to the preset instruction.

In some embodiments, following S102, after the play of the predetermined multimedia file is terminated, the first service channel is released. For example, when the predetermined multimedia file finishes to be played, the subscriber may terminate responding to the service request (such as releasing the first service channel) to hang up the call. For another example, although the predetermined multimedia file does not finish to be played, the first service channel may be released based on an instruction of the subscriber for terminating playing the predetermined multimedia file. For another example, an instruction for terminating playing the predetermined multimedia file is received from the sender of the service request via the first service channel, and thus the play of the predetermined multimedia file is terminated and the first service channel is released. Those skilled in the art can understand that, the embodiments may further optimize a trigger time of releasing the first service channel, so that the terminal may respond to the instruction of the current subscriber or the sender of the service request more rapidly and reasonably according to a playing status of the predetermined multimedia file, which may avoid excessive waste of the terminal's memory and power resources, and improve user experience.

From above, compared with the existing techniques where constant warning tone is sent to a sender of an incoming call based on a network, in embodiments of the present disclosure, the predetermined multimedia file which is personalized can be sent by the terminal to the sender of the incoming call based on the first service channel, which may improve user experience.

Further, prior to receiving a service request associated with a current subscriber identity card, the current subscriber identity card may be in a call using a second service channel which is set up based on the current subscriber identity card. Compared with the existing techniques where the terminal can only keep one service channel in an activated state at a time point, in embodiments of the present disclosure, one subscriber identity card can set up at least two service channels in the activated state, so that the subscriber in a calling state can still play personalized response to an originating subscriber of subsequent calls based on other service channel, which optimizes processing logic to multiple service channels, enables the second service channel to retain the activated state when setting up the first service channel to make the call, and greatly improves user experience.

Figure 3:
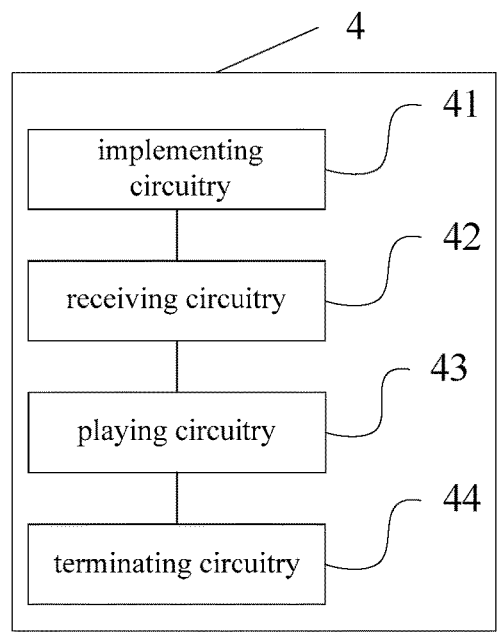
FIG. 3 schematically illustrates a structural diagram of an incoming call responding device for a multi-channel terminal according to an embodiment.

FIG. 3 schematically illustrates a structural diagram of an incoming call responding device for a multi-channel terminal according to an embodiment. Those skilled in the art can understand that, the incoming call responding device 4 for the multi-channel terminal is used for implementing methods provided in the above embodiments as shown in FIG. 2. In some embodiments, the incoming call responding device 4 for the multi-channel terminal includes: a receiving circuitry 42 configured to receive a service request associated with a current subscriber identity card, and the service request includes a called service request to a current subscriber which is identified by the current subscriber identity card; and a playing circuitry 43 configured to: in response to the service request, set up a first service channel for making a call and play a predetermined multimedia file based on an instruction of the current subscriber, and the first service channel is set up based on the current subscriber identity card.

In some embodiments, the device 4 may further include an implementing circuitry 41 configured for the current subscriber identity card to make a call using a second service channel which is set up based on the current subscriber identity card, before the service request associated with the current subscriber identity card is received.

In some embodiments, when the playing circuitry 43 sets up the first service channel for making a call, the second service channel retains an activated state.

In some embodiments, the first and second service channels may be set up based on a same service access way.

In some embodiments, the device 4 may further include a terminating circuitry 45 configured to: after the play of the predetermined multimedia file is terminated, release the first service channel.

In some embodiments, the instruction of the current subscriber may include: a real-time instruction obtained by interaction with the current subscriber after receiving the service request, or an instruction predetermined by the current subscriber before receiving the service request.

In some embodiments, service requested by the service request may include voice service or video service.

In some embodiments, the service request may include a service request based on an IMS network, and service requested by the service request may include service based on the IMS network.

In some embodiments, the service requested by the service request may include VoLTE service or VoWiFi service.

In some embodiments, the first and second service channels perform service data transmission based on a data channel which is set up based on a radio network.

In some embodiments, the data channel may be a data channel based on an IMS network.

In some embodiments, the data channel based on the IMS network may include a data channel corresponding to IMS PDN.

In some embodiments, the first and second service channels may correspond to different ports of the data channel.

In some embodiments, when the second service channel is set up or released based on the current subscriber identity card, the device 4 may receive the service request associated with the current subscriber identity card.

More details about working principles and working modes of the device 4 may be referred to the above descriptions of FIG. 2, and are not described in detail here.

Figure 4:
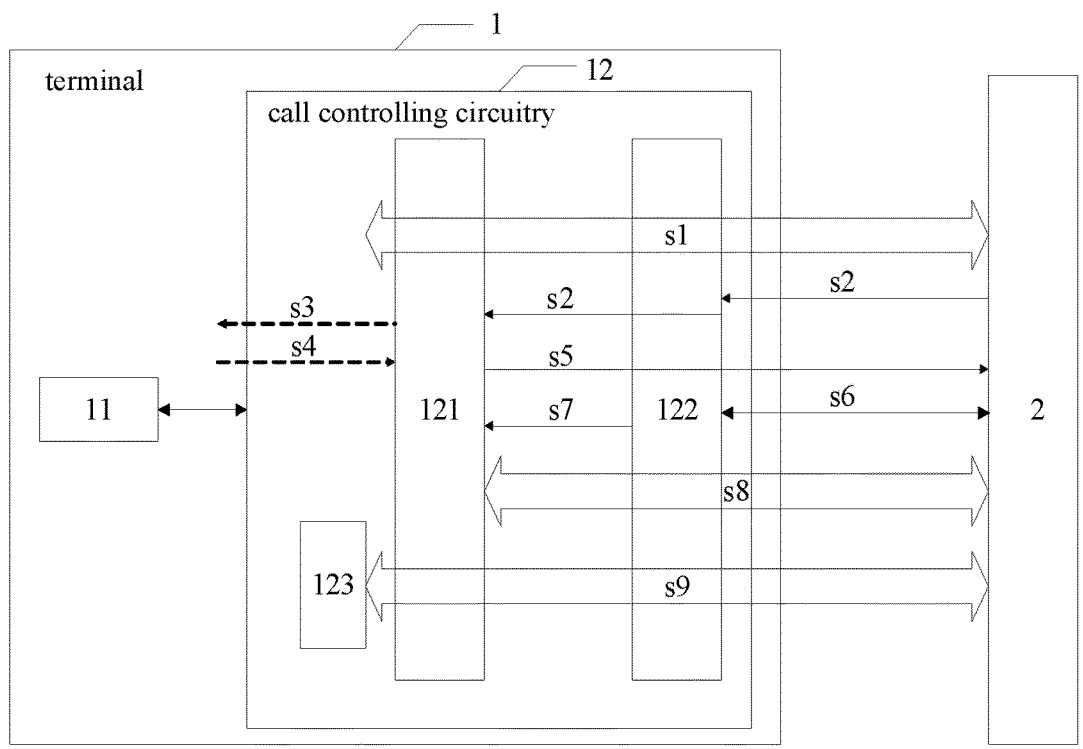
FIG. 4 schematically illustrates an application scene diagram of an incoming call responding method for a multi-channel terminal according to an embodiment.

FIG. 4 schematically illustrates an application scene diagram of an incoming call responding method for a multi-channel terminal according to an embodiment. The terminal 1 may be a mobile terminal configured with a subscriber identity card 11 that is used for identifying a subscriber (not shown in FIG. 4). The service request includes a called service request to the subscriber.

In the application scene, the service request is sent to the terminal 1 based on a network 2. The network 2 may include a radio network for setting up a radio connection, or include a service network for providing service to the terminal 1. The radio network may include a radio network which can be realized by a public communication network, such as 5G, 4G, 3G or GPRS network, or a wireless local area network, such as WiFi. Those skilled in the art can understand that, networks which take radio electromagnetic wave as a transmitting medium may serve as the radio network in embodiments of the present disclosure, and are not described in detail here.

In some embodiments, voice service, video service and short message service based on 4G Long Term Evolution (LTE) network may be taken as VoLTE service, and voice service, video service and short message service based on WiFi network may be taken as VoWiFi service.

In some embodiments, the service network may correspond to the service request. For example, when the service request is a VoLTE service request or a VoWiFi service request, the service network may be an IMS network.

In some embodiments, the terminal 1 may set up a PDN for transmitting data with the IMS network, i.e., a data channel with the IMS network. In some embodiments, the data channel may be a channel corresponding to IMS PDN. The channel corresponding to the same IMS PDN may set up at least two service channels which respectively correspond to different ports of the channel corresponding to the IMS PDN.

In some embodiments, the subscriber identity card 11 in the terminal 1 sets up two service channels (not shown in FIG. 4), one (the first service channel) using a data channel to transmit service data via a first port (not shown in FIG. 4), while the other (the second service channel) using the same data channel to transmit service data via a second port (not shown in FIG. 4). The two service channels may transmit service data using the data channel at a same time. In some embodiments, the data channel may be set up by a service channel set-up controlling circuitry 121 and a radio source set-up controlling circuitry 122 in a call controlling circuitry 12 based on a radio connection with the network 2. For example, in VoLTE service, the data channel may be a channel corresponding to IMS PDN.

When the subscriber identity card 11 is using the second service channel to make a first call s1, the terminal 1 receives a called service request s2 to a subscriber (not shown in FIG. 4) identified by the subscriber identity card 11. The call controlling circuitry 12 may perform s3 of indicating the called service request s2 to the subscriber identity card 11. If an instruction s4 fed back by the subscriber identity card 11 includes an automatic responding instruction, the call controlling circuitry 12 sets up the first service channel to respond to the called service request s2 and starts playing a predetermined multimedia file s9, so as to get through a second call s8 timely and further playing to a sender of the called service request s2 the predetermined multimedia file which is stored in a multimedia file storing circuitry 123. As the second call s8 and the first call s1 are made in different service channels, they are not conflicting. The second service channel corresponding to the first call s1 can still retain an activated state, which may effectively improve operation experience of two subscribers of the call. In some embodiments, the predetermined multimedia file may be recorded by the subscriber in advance and stored in the multimedia file storing circuitry 123.

In VoLTE service, the service channel set-up controlling circuitry 121 maintains the first call s1 to be performed normally, and performs s5 to receive the called service request s2. The radio source set-up controlling circuitry 122 interacts with the network 2 based on the radio connection (which is used for the service channel set-up controlling circuitry 121 and the radio source set-up controlling circuitry 122 to set up the data channel to interact with the network 2 for data transmission), so as to revise and reconfigure radio resources and prepare radio resources s6 for the second service channel via the second port. After the radio source set-up controlling circuitry 122 succeeds in preparing radio resources s7 for the call of the second service channel, a channel s8 of the second call is set up between the terminal 1 and the network 2 successfully. A sender of the called service request s2 may use the second service channel to make the second call s9 with the terminal 1. The terminal 1 plays to the sender of the called service request s2 the predetermined multimedia file which is stored in the multimedia file storing circuitry 123 via the second call s9, while the first call s1 is still in a normal calling state.

In some embodiments, when the subscriber identity card 11 is using the second service channel to make a first call s1, the terminal 1 receives a called service request s2 to the subscriber. The call controlling circuitry 12 may directly set up the first service channel for making a call to respond to the called service request s2 and starts playing the predetermined multimedia file s9, according to an instruction preset by the subscriber. In this way, a waiting time period of the sender of the called service request s2 may be shortened, and the first call s1 of the subscriber is prevented from being interfered.

In some embodiments, when receiving the call service request s2, the terminal 1 may not have used the second service channel to make a call. If s4 indicates that the subscriber doesn't want to listen to the incoming call currently and the terminal 1 is instructed to play the predetermined multimedia file to the incoming call, the terminal 1 may directly set up the first service channel to play the predetermined multimedia file.

In some embodiments, the multimedia file storing circuitry 123 may be pre-stored in the terminal 1 in hardware or software, or stored in a cloud or other external storing devices and perform data interaction with the terminal 1.

It should be noted that, although the above embodiments are described by taking a single subscriber in a mobile terminal as an example, embodiments of the present disclosure is not limited thereto. That is, embodiments of the present disclosure are also adapted to a terminal of multi-subscribers, such as a terminal supporting multiple subscriber identity cards, as long as at least one subscriber of the multi-subscribers is capable of setting up multiple service channels.

Although the present disclosure has been disclosed above with reference to embodiments thereof, it should be understood that the disclosure is presented by way of example only, and not limitation. Those skilled in the art can modify and vary the embodiments without departing from the spirit and scope of the present disclosure.

What is claimed is:

1. An incoming call responding method for a multi-channel terminal, comprising:
    receiving a service request associated with a current subscriber identity card, wherein the service request comprises a called service request to a current subscriber which is identified by the current subscriber identity card; and
    in response to the service request, setting up a first service channel for making a call and playing a predetermined multimedia file based on an instruction of the current subscriber, wherein the first service channel is set up based on the current subscriber identity card.

2. The method according to claim 1, wherein prior to receiving a service request associated with a current subscriber identity card, the current subscriber identity card is in a call using a second service channel which is set up based on the current subscriber identity card.

3. The method according to claim 2, wherein when the first service channel is set up for making a call, the second service channel retains an activated state.

4. The method according to claim 2, wherein the first and second service channels are set up based on a same service access way.

5. The method according to claim 2, wherein the first and second service channels perform service data transmission based on a data channel which is set up based on a radio network.

6. The method according to claim 1, further comprising:
    after the play of the predetermined multimedia file is terminated, releasing the first service channel.

7. The method according to claim 1, wherein the instruction of the current subscriber comprises:
    a real-time instruction obtained by interaction with the current subscriber after receiving the service request, or an instruction predetermined by the current subscriber before receiving the service request.

8. The method according to claim 1, wherein service requested by the service request comprises voice service or video service.

9. The method according to claim 1, wherein the service request comprises a service request based on an IP Multimedia Subsystem (IMS) network, and service requested by the service request comprises service based on the IMS network.

10. The method according to claim 9, wherein the service requested by the service request comprises VoLTE service or VoWiFi service.

11. An incoming call responding device for a multi-channel terminal, comprising:
    a receiving circuitry configured to receive a service request associated with a current subscriber identity card, wherein the service request comprises a called service request to a current subscriber which is identified by the current subscriber identity card; and
    a playing circuitry configured to: in response to the service request, set up a first service channel for making a call and play a predetermined multimedia file based on an instruction of the current subscriber, wherein the first service channel is set up based on the current subscriber identity card.

12. The device according to claim 11, further comprising an implementing circuitry configured for the current subscriber identity card to make a call using a second service channel which is set up based on the current subscriber identity card, before the service request associated with the current subscriber identity card is received.

13. The device according to claim 12, wherein when the playing circuitry sets up the first service channel for making a call, the second service channel retains an activated state.

14. The device according to claim 12, wherein the first and second service channels are set up based on a same service access way.

15. The device according to claim 12, wherein the first and second service channels perform service data transmission based on a data channel which is set up based on a radio network.

16. The device according to claim 11, further comprising a terminating circuitry configured to:
    after the play of the predetermined multimedia file is terminated, release the first service channel.

17. The device according to claim 11, wherein the instruction of the current subscriber comprises:
    a real-time instruction obtained by interaction with the current subscriber after receiving the service request, or an instruction predetermined by the current subscriber before receiving the service request.

18. The device according to claim 11, wherein service requested by the service request comprises voice service or video service.

19. The device according to claim 11, wherein the service request comprises a service request based on an IP Multimedia Subsystem (IMS) network, and service requested by the service request comprises service based on the IMS network.

20. The device according to claim 19, wherein the service requested by the service request comprises VoLTE service or VoWiFi service.

* * * * *